(12) United States Patent
Walmsley

(10) Patent No.: US 7,259,889 B1
(45) Date of Patent: Aug. 21, 2007

(54) METHOD AND APPARATUS FOR DITHERING

(75) Inventor: Simon Robert Walmsley, Epping (AU)

(73) Assignee: Silverbrook Research Pty Ltd, Balmain, New South Wales (AU)

(*) Notice: Subject to any disclaimer, the term of this patent is extended or adjusted under 35 U.S.C. 154(b) by 0 days.

(21) Appl. No.: 09/575,120

(22) Filed: May 23, 2000

(30) Foreign Application Priority Data

May 25, 1999 (AU) .................................. PQ0560

(51) Int. Cl.
G06F 15/00 (2006.01)
G06K 1/60 (2006.01)
H04N 15/00 (2006.01)

(52) U.S. Cl. .................. 358/1.9; 358/1.18; 358/501

(58) Field of Classification Search .............. 358/1.8, 358/1.9, 534, 535, 530, 3.13; 347/19, 86, 347/85, 87
See application file for complete search history.

(56) References Cited

U.S. PATENT DOCUMENTS

| 4,350,996 | A | | 9/1982 | Rosenfeld |
| 5,602,653 | A | | 2/1997 | Curry |
| 5,633,990 | A | * | 5/1997 | Housel .................... 358/1.9 |
| 5,809,217 | A | * | 9/1998 | Bunce ..................... 358/1.9 |
| 6,394,612 | B1 | * | 5/2002 | Yano ..................... 358/3.13 |
| 7,085,010 | B2 | * | 8/2006 | Walmsley ................. 358/1.9 |
| 2004/0027597 | A1 | * | 2/2004 | Walmsley ................. 358/1.9 |

FOREIGN PATENT DOCUMENTS

| EP | 0357175 A | 3/1990 |
| WO | WO99/04368 | 1/1999 |

* cited by examiner

*Primary Examiner*—Twyler Lamb
*Assistant Examiner*—Benjamin Dulaney

(57) ABSTRACT

A method of, and apparatus for, dithering an image to be printed. Color component values of odd and even pixels of an image are stored in a dither cell. The dither cell is mapped to a staggered dither cell such that lines of odd pixel component values are staggered relative to lines of even pixel component values. Addressing of the staggered dither cell is determined by an address generator that also addresses a buffer storing an up-interpolated image. Corresponding values in the staggered dither cell and the buffer are compared to determine which nozzles of a printhead are fired.

10 Claims, 11 Drawing Sheets

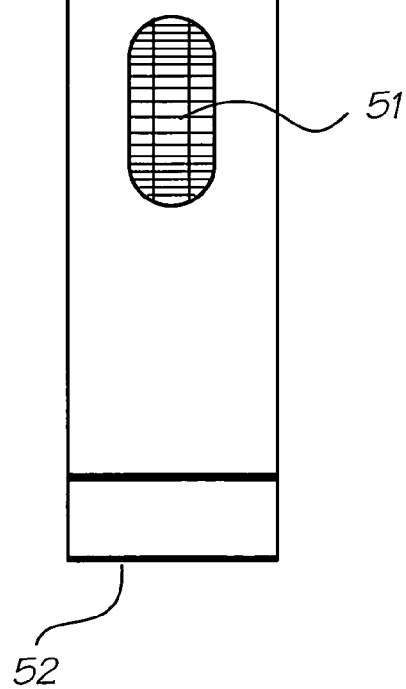
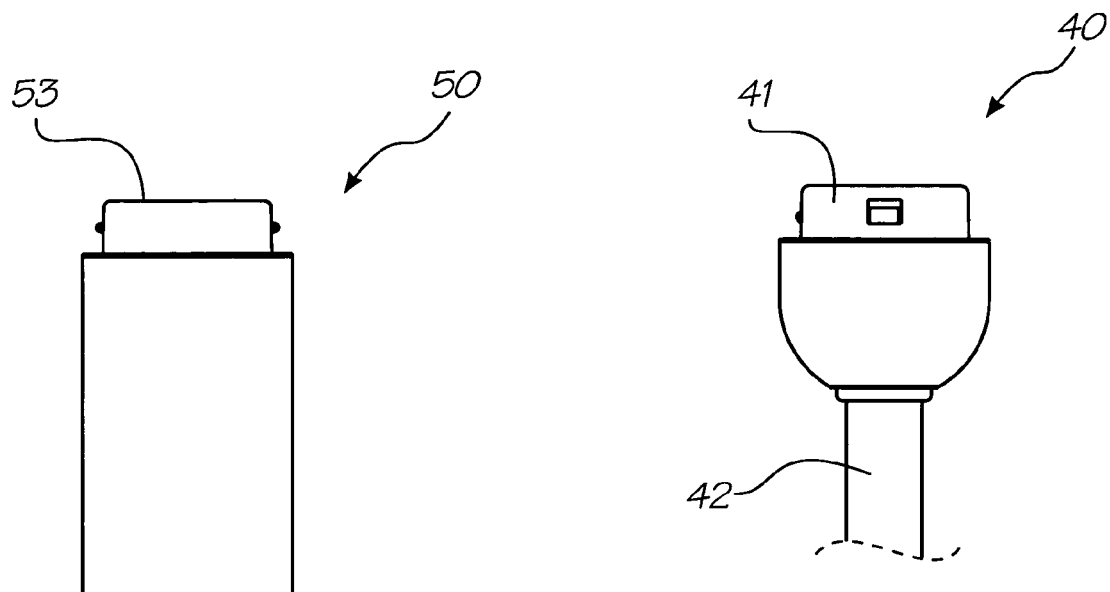
FIG. 4
FIG. 5
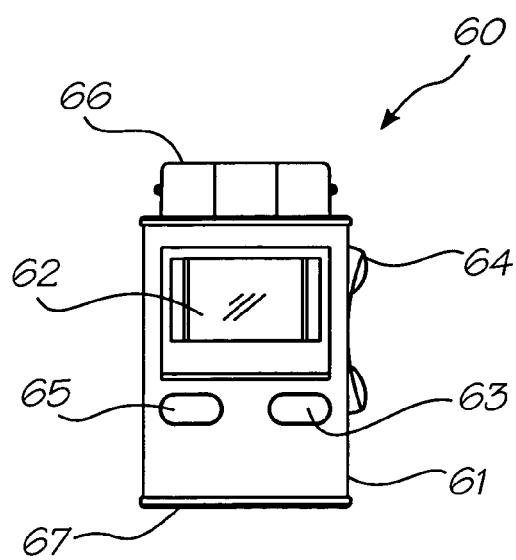
FIG. 6

METHOD AND APPARATUS FOR DITHERING

FIELD OF THE INVENTION

The invention relates to a compact printer system able to print full-color, business card size documents from a device about the size of a pen. The system includes various hot-connectable modules that provide a range of functions. In particular the invention relates to a method of, and apparatus for, dithering an image to be printed.

Reference may be had to co-pending applications claiming priority from Australian Provisional Patent Application number PQ0560 dated 25 May 1999. The co-pending applications describe related modules and methods for implementing the compact printer system. The co-pending applications are as follows:

| USSN | Our Docket No. | Our Title |
| --- | --- | --- |
| 6924907 | PP01US | Compact Color Printer Module |
| 6712452 | PP02US | Modular Compact Printer System |
| 6416160 | PP03US | Nozzle Capping Mechanism |
| 6238043 | PP04US | Ink Cartridge for Compact Printer System |
| 6958826 | PP07US | Controller for A Printer Module |
| 6812972 | PP08US | Camera Module for Compact Printer System |
| 6553459 | PP10US | Memory Module for Compact Printer System |
| 6967741 | PP11US | Effects Module for Compact Printer System |
| 6956669 | PP12US | Effects Processor for Effects Module |
| 6903766 | PP13US | Timer Module for Compact Printer System |
| 6804026 | PP15US | Color Conversion Method For Compact Printer System |
| 6975429 | PP17US | Method and Apparatus of Image Conversion |

BACKGROUND OF THE INVENTION

Microelectronic manufacturing techniques have led to the miniaturization of numerous devices. Mobile phones, personal digital assistant devices, and digital cameras are very common examples of the miniaturization trend.

One device that has not seen the advantage of microelectronic manufacturing techniques is the printer. Commercially available printers are large compared to many of the devices they could support. For instance, it is impractical to carry a color printer for the purpose of instantly printing photographs taken with known compact digital cameras.

A compact printhead has been described in co-pending United States patent applications filed simultaneously to the present application and hereby incorporated by cross reference:

| USSN | Our Docket No. | Our Title |
| --- | --- | --- |
| 6428133 | IJ52US | Ink Jet Printhead Having a Moving Nozzle with an Externally Arranged Actuator |
| 6526658 | IJM52US | Method of Manufacture of an Ink Jet Printhead Having a Moving Nozzle with an Externally Arranged Actuator |
| 6390591 | MJ58US | Nozzle Guard for an Ink jet Printhead |
| 7018016 | MJ62US | Fluidic seal for an ink jet nozzle assembly |
| 6328417 | MJ63US | Ink Jet Printhead Nozzle Array |

Known ink jet printers are only capable of printing dots in a bi-level fashion whereas known image capture devices (cameras) capture images in continuous tones. It is known in the prior art to transform the continuous tone captured images to bi-level images for printing. The known techniques are processing intensive. A more efficient processing method is required for a compact printer system.

SUMMARY OF THE INVENTION

In one form, the invention resides in a method of generating a staggered dither cell for an image to be printed, said method comprising the steps of:

writing color component values corresponding to even pixels in first entry locations in said dither cell;

writing color component values corresponding to odd pixels in second entry locations in said dither cell; and mapping said dither cell to a staggered dither cell such that lines of said even pixel values are staggered relative to lines of said odd pixel values.

Further features of the invention will be evident from the following description.

BRIEF DESCRIPTION OF THE DRAWINGS

In order to assist with describing preferred embodiments of the invention, reference will be made to the following figures in which:

FIG. 4 is a communication module;
FIG. 5 is a flash module;
FIG. 6 is a timer module.

DETAILED DESCRIPTION OF THE PREFERRED EMBODIMENTS

Referring to FIGS. 1 to 12, there are shown various modules that together form a compact printer system. Individual modules can be attached and detached from the compact printer configuration to allow a user-definable solution to business-card sized printing. Images can also be transferred from one compact printer to another without the use of a secondary computer system. Modules have a minimal user-interface to allow straightforward interaction.

A compact printer system configuration consists of a number of compact printer modules connected together. Each compact printer module has a function that contributes to the overall functionality of the particular compact printer configuration. Each compact printer module is typically shaped like part of a pen, physically connecting with other compact printer modules to form the complete pen-shaped device. The length of the compact printer device depends on the number and type of compact printer modules connected. The functionality of a compact printer configuration depends on the compact printer modules in the given configuration.

The compact printer modules connect both physically and logically. The physical connection allows modules to be connected in any order, and the logical connection is taken care of by the compact printer Serial Bus—a bus that provides power, allows the modules to self configure and provides for the transfer of data.

In terms of physical connection, most compact printer modules consist of a central body, a male connector at one end, and a female connector at the other. Since most modules have both a male and female connector, the modules can typically be connected in any order. Certain modules only have a male or a female connector, but this is determined by the function of the module. Adaptor modules allow these single-connector modules to be connected at either end of a given compact printer configuration.

A four wire physical connection between all the compact printer modules provides the logical connection between them in the form of the compact printer Serial Bus. The compact printer Serial Bus provides power to each module, and provides the means by which data is transferred between modules. Importantly, the compact printer Serial Bus and accompanying protocol provides the means by which the compact printer system auto-configures, reducing the user-interface burden on the end-user.

Figure 2:
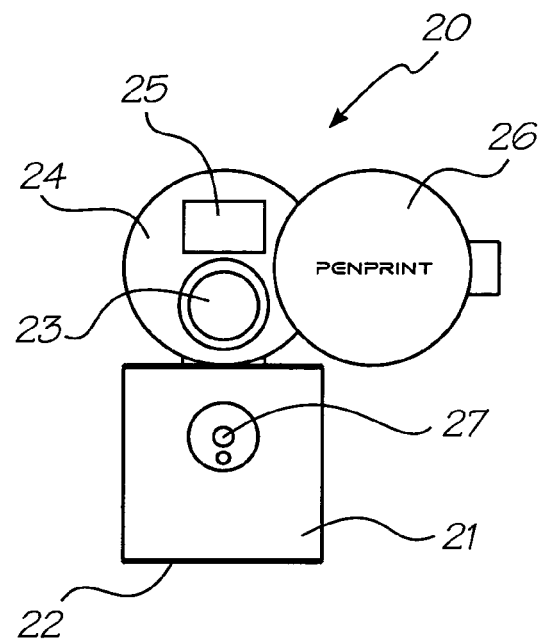
FIG. 2 is a camera module.
Figure 3:
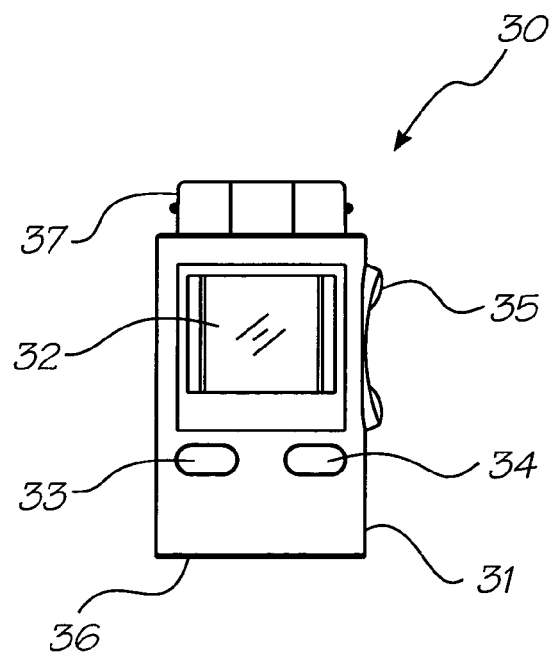
FIG. 3 is a memory module.
Figure 7:
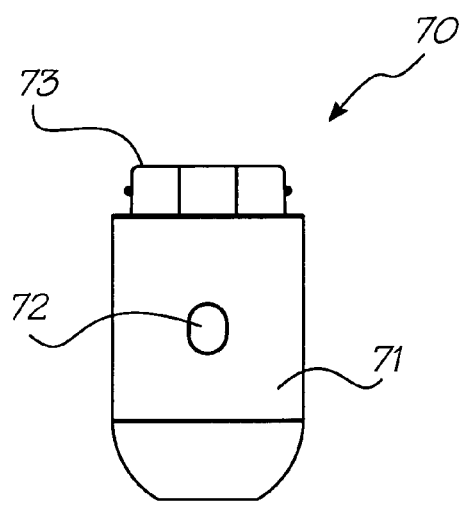
FIG. 7 is a laser module.

Compact printer modules can be grouped into three types:
image processing modules including a Printer Module (FIG. 1), a Camera Module (FIG. 2), and a Memory Module (FIG. 3). Image processing modules are primarily what sets the compact printer system apart from other pen-like devices. Image processing modules capture, print, store or manipulate photographic images;
housekeeping modules including an Adapter Module (FIG. 10), an Effects Module (FIG. 8), a Communications Module (FIG. 4), and a Timer Module (FIG. 6). Housekeeping modules provide services to other modules or extended functionality to other modules; and
isolated modules including a Pen Module (FIG. 11) and a Laser Module (FIG. 7). Isolated modules are those that attach to the compact printer system but are completely independent of any other module. They do not necessarily require power, and may even provide their own power. Isolated Modules are defined because the functionality they provide is typically incorporated into other pen-like devices.

Although housekeeping modules and isolated modules are useful components in a compact printer system, they are extras in a system dedicated to image processing and photographic manipulation. Life size (1:1) illustrations of the compact printer modules are shown in FIGS. 1 to 12, and example configurations produced by connecting various modules together are shown in FIGS. 13 to 16.

Figure 1:
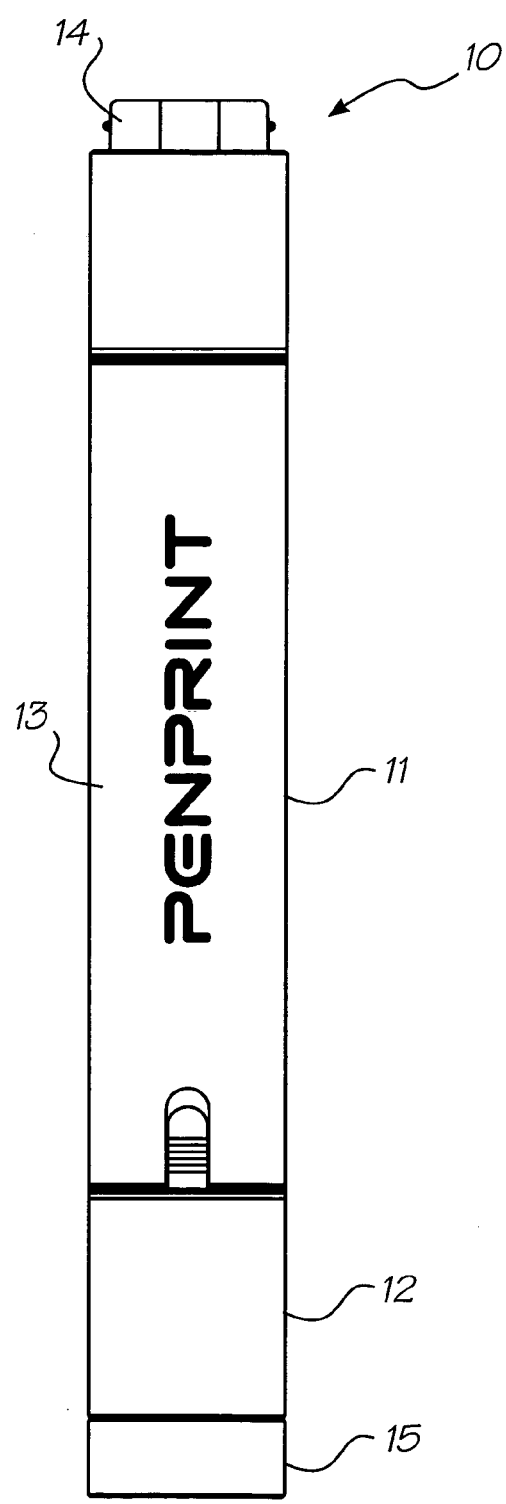
FIG. 1 is a printer module.

FIG. 1 shows a printer module that incorporates a compact printhead described in co-pending United States patent applications listed in the Background section of this application, incorporated herewith by reference, and referred to herewith as a Memjet printhead. The Memjet printhead is a drop-on-demand 1600 dpi inkjet printer that produces bi-level dots in up to 4 colors to produce a printed page of a particular width. Since the printhead prints dots at 1600 dpi, each dot is approximately 22.5 µm in diameter, and spaced 15.875 µm apart. Because the printing is bi-level, the input image should be dithered or error-diffused for best results. Typically a Memjet printhead for a particular application is page-width. This enables the printhead to be stationary and allows the paper to move past the printhead. A Memjet printhead is composed of a number of identical ½ inch Memjet segments.

The printer module 10 comprises a body 11 housing the Memjet printhead. Power is supplied by a three volt battery housed in battery compartment 12. The printhead is activated to commence printing when a business card (or similar sized printable media) is inserted into slot 13. Male connector 14 and female connector 15 facilitate connection of other modules to the printer module 10.

FIG. 2 shows a camera module 20. The camera module provides a point-and-shoot camera component to the compact printer system as a means of capturing images. The camera module comprises a body 21 having a female connector 22. A lens 23 directs an image to an image sensor and specialized image processing chip within the camera 24. A conventional view finder 25 is provided as well as a lens cap 26. An image is captured when the Take button 27 is pushed. Captured images are transferred to the Printer Module 10 for subsequent printing, manipulation, or storage. The Camera Module also contains a self-timer mode similar to that found on regular cameras.

FIG. 3 shows a Memory Module 30 comprising a body 31, LCD 32, IN button 33, OUT button 34 and SELECT button 35. The Memory Module 30 is a standard module used for storing photographic images captured by the Camera 20. The memory module stores 48 images, each of which can be accessed either at full resolution or at thumbnail resolution. Full resolution provides read and write access to individual images, and thumbnail resolution provides read access to 16 images at once in thumbnail form.

The Memory Module 30 attaches to other modules via a female connector 36 or male connector 37. The male and female connectors allow the module to be connected at either end of a configuration. Power is provided from the Printer Module 10 via the Serial Bus.

A Communications Module 40 is shown in FIG. 4. The communications module 40 consists of a connector 41 and a cable 42 that terminates in an appropriate connector for a computer port, such as a USB port, RS232 serial port or parallel port. The Communications Module 40 allows the compact printer system to be connected to a computer. When so connected, images can be transferred between the computer and the various modules of the compact printer system. The communications module allows captured images to be downloaded to the computer, and new images for printing to be uploaded into the printer module 10.

A Flash Module 50 is shown in FIG. 5. The Flash Module 50 is used to generate a flash with flash cell 51 when taking photographs with the Camera Module 20. The Flash Module attaches to other modules via female connector 52 and male connector 53. It contains its own power source. The Flash Module is automatically selected by the Camera Module when required. A simple switch allows the Flash Module to be explicitly turned off to maximize battery life.

FIG. 6 shows a Timer Module 60 that is used to automate the taking of multiple photos with the Camera Module 20, each photo separated by a specific time interval. The captured photos are stored in Memory Module 30. Any flash requirements are handled by the Camera Module 20, and can therefore be ignored by the Timer Module. The Timer Module 60 consists of a body 61 housing a LCD 62, START/STOP button 63 and UNITS button 64. A SELECT button 65 allows the user to select time units and the number of units are set by UNITS button 64. The Timer Module 60 includes a male connector 66 and female connector 67. The Timer Module takes its power from the Printer Module 10 via the Serial Bus.

A Laser Module 70 is shown in FIG. 7. The Laser Module 70 consists of a body 71 containing a conventional laser pointer operated by button 72. As the Laser Module is a terminal module it only has one connector, which in the example is a male connector 73. The Laser Module is an isolated module, in that it does not perform any image capture, storage, or processing. It exists as a functional addition to the compact printer system. It is provided because laser pointer services are typically incorporated into other pen-like devices. The Laser Module contains its own power supply and does not appear as a device on the Serial Bus.

Figure 8:
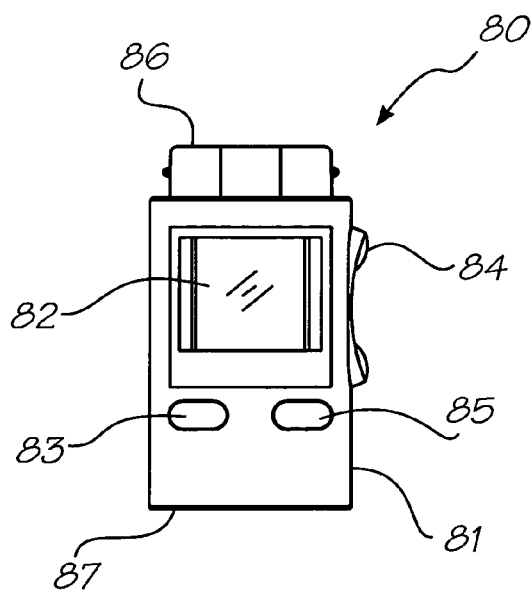
FIG. 8 is an effects module.

The Effects Module shown in FIG. 8 is an image processing module. It allows a user to select a number of effects and applies them to the current image stored in the Printer Module 10. The effects include borders, clip-art, captions, warps, color changes, and painting styles. The Effects Module comprises a body 81 housing custom electronics and a LCD 82. A CHOOSE button 83 allows a user to choose between a number of different types of effects. A SELECT button 84 allows the user to select one effect from the number of effects of the chosen type. Pressing the APPLY button 85 applies the effect to image stored in the Printer Module 10. The Effects Module obtains power from the Serial Bus. Male connector 86 and female connector 87 allow the Effects Module to be connected to other compact printer system modules.

Figure 9:
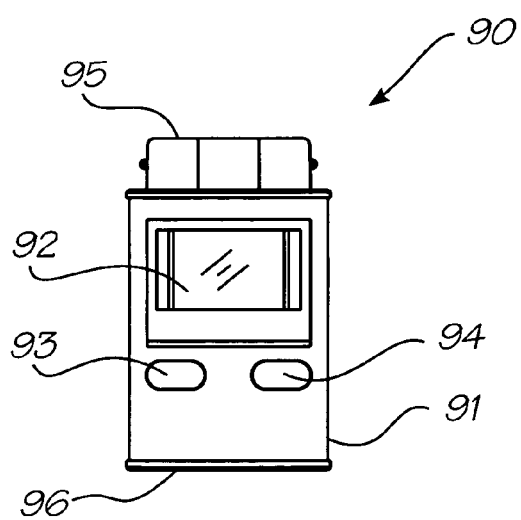
FIG. 9 is a characters module.

FIG. 9 shows a Character Module 90 that is a special type of Effects Module (described above) that only contains character clip-art effects of a given topic or genre. Examples include The Simpsons®, Star Wars®, Batman®, and Dilbert® as well as company specific modules for McDonalds® etc. As such it is an image processing module. It consists of a body 91 housing custom electronics and a LCD 92. SELECT button 93 allows the user to choose the effect that is to be applied with APPLY button 94. The Character Module obtains power from the Serial Bus through male connector 95 and female connector 96.

Figure 10:
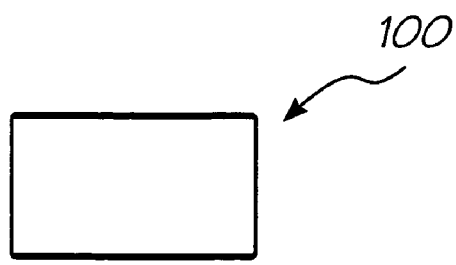
FIG. 10 is an adaptor module.

The Adaptor Module 100, shown in FIG. 10, is a female/female connector that allows connection between two modules that terminate in male connectors. A male/male connector (not shown) allows connection between two modules that terminate in female connectors. The Adaptor Module is a housekeeping module, in that it facilitates the use of other modules, and does not perform any specific processing of its own.

All "through" modules have a male connector at one end, and a female connector at the other end. The modules can therefore be chained together, with each module connected at either end of the chain. However some modules, such as the Laser Module 70, are terminating modules, and therefore have either a male or female connector only. Such single-connector modules can only be connected at one end of the chain. If two such modules are to be connected at the one time, an Adaptor Module 100 is required.

Figure 11:
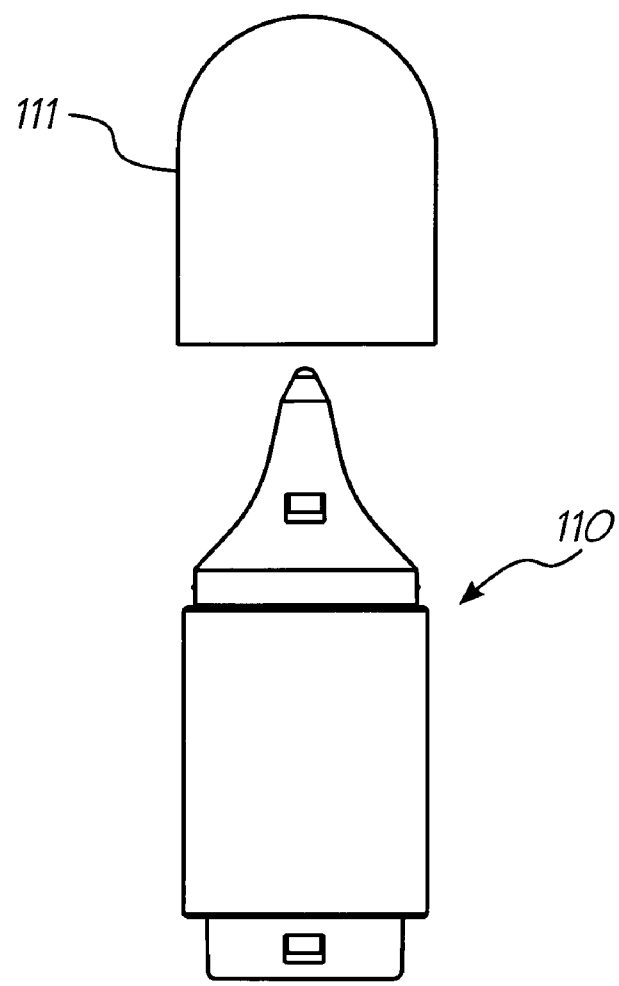
FIG. 11 is a pen module.

FIG. 11 shows a Pen Module 110 which is a pen in a module form. It is an isolated module in that it attaches to the compact printer system but is completely independent of any other module. It does not consume or require any power. The Pen Module is defined because it is a convenient extension of a pen shaped, pen sized device. It may also come with a cap 111. The cap may be used to keep terminating connectors clean in the case where the chain ends with a connector rather than a terminating module.

Figure 12:
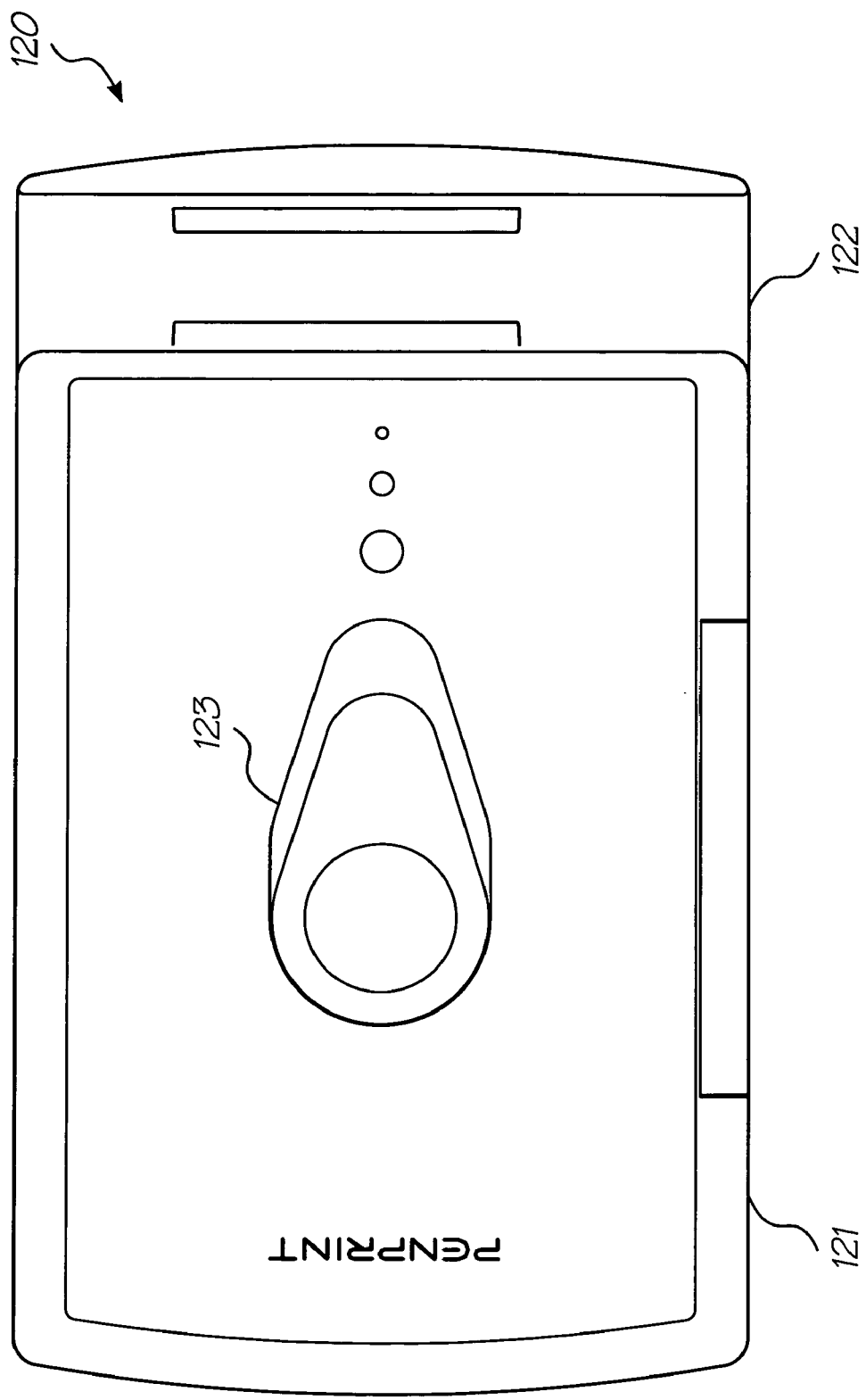
FIG. 12 is a dispenser module.

To assist with accurately feeding a business card sized print media into slot 13 of the printer module 10, a dispenser module 120 is provided as shown in FIG. 12. The dispenser module 120 comprises a body 121 that holds a store of business card sized print media. A Printer Module 10 locates into socket 122 on the dispenser module 120. When correctly aligned, a card dispensed from the dispenser module by slider 123 enters slot 13 and is printed.

In the sense that a minimum configuration compact printer system must be able to print out photos, a minimum compact printer configuration contains at least a Printer Module 10. The Printer Module holds a single photographic image that can be printed out via its Memjet printer. It also contains the 3V battery required to power the compact printer system.

Figure 13:
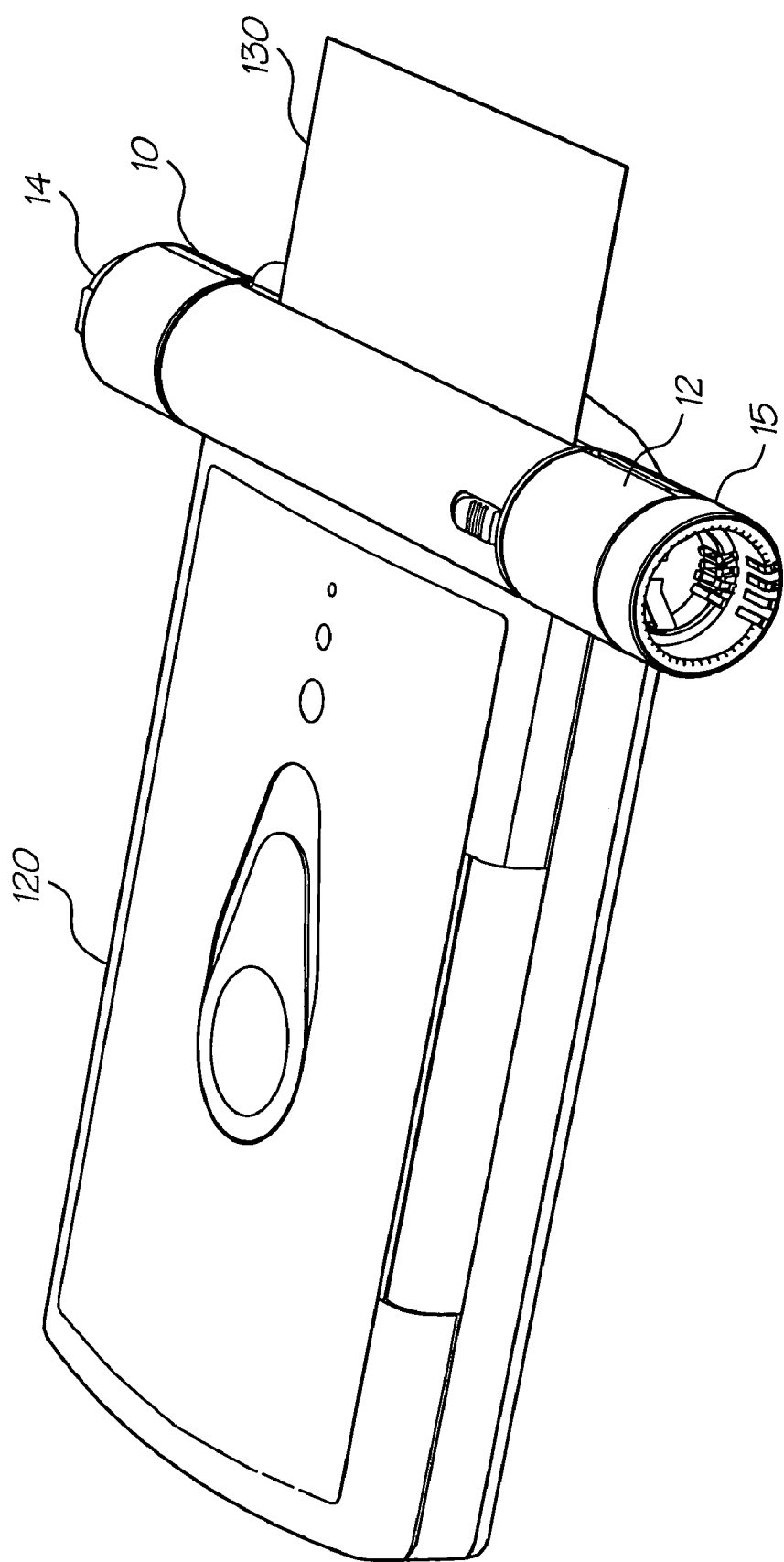
FIG. 13 is a first compact printer configuration.

In this minimum configuration, the user is only able to print out photos. Each time a user inserts a business card 130 into the slot in the Printer Module, the image in the Printer Module is printed onto the card. The same image is printed each time a business card is inserted into the printer. In this minimum configuration there is no way for a user to change the image that is printed. The dispenser module 120 can be used to feed cards 130 into the Printer Module with a minimum of fuss, as shown in FIG. 13.

Figure 14:
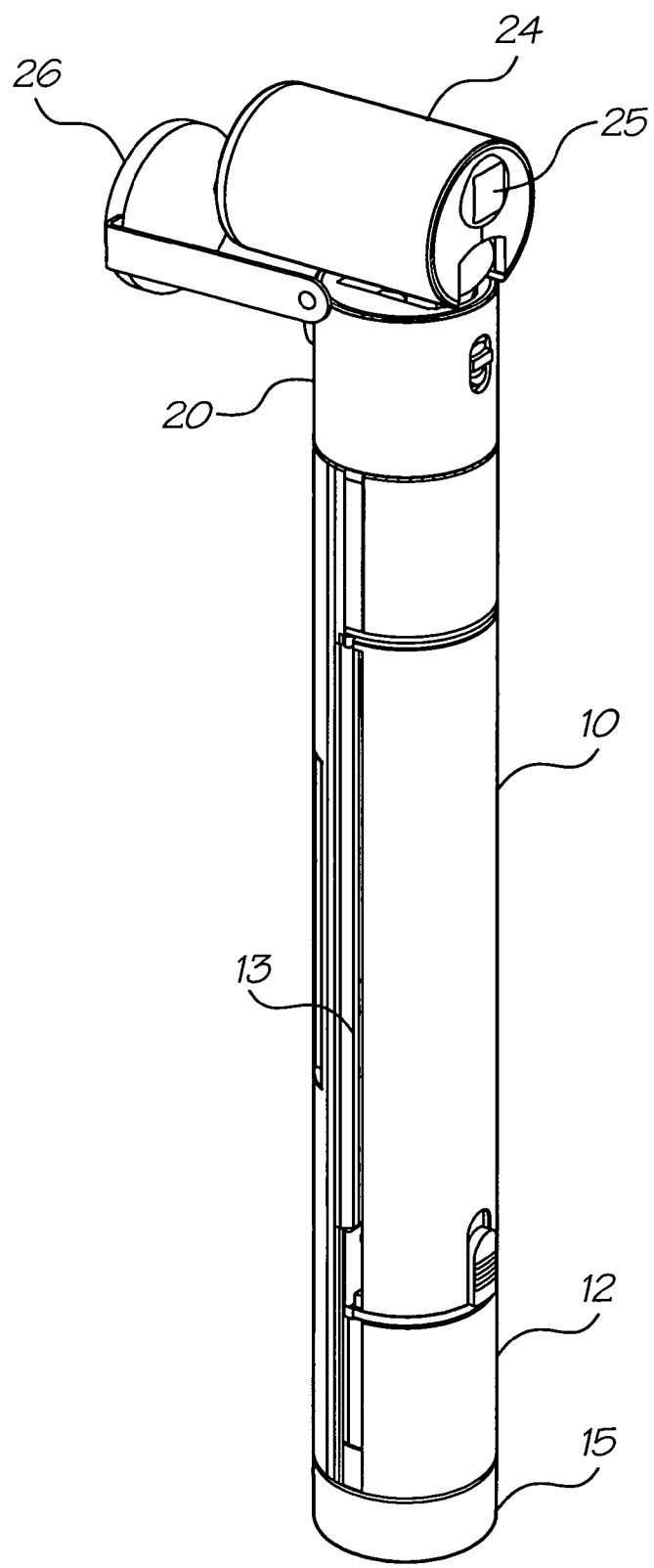
FIG. 14 is a second compact printer configuration.

By connecting a Camera Module 20 to the minimum configuration compact printer system the user now has an instant printing digital camera in a pen, as shown in FIG. 14. The Camera Module 20 provides the mechanism for capturing images and the Printer Module 10 provides the mechanism for printing them out. The battery in the Printer Module provides power for both the camera and the printer.

When the user presses the "Take" button 27 on the Camera Module 20, the image is captured by the camera 24 and transferred to the Printer Module 10. Each time a business card is inserted into the printer the captured image is printed out. If the user presses "Take" on the Camera Module again, the old image in the Printer Module is replaced by the new image.

If the Camera Module is subsequently detached from the compact printer system, the captured image remains in the Printer Module, and can be printed out as many times as desired. The Camera Module is simply there to capture images to be placed in the Printer Module.

Figure 15:
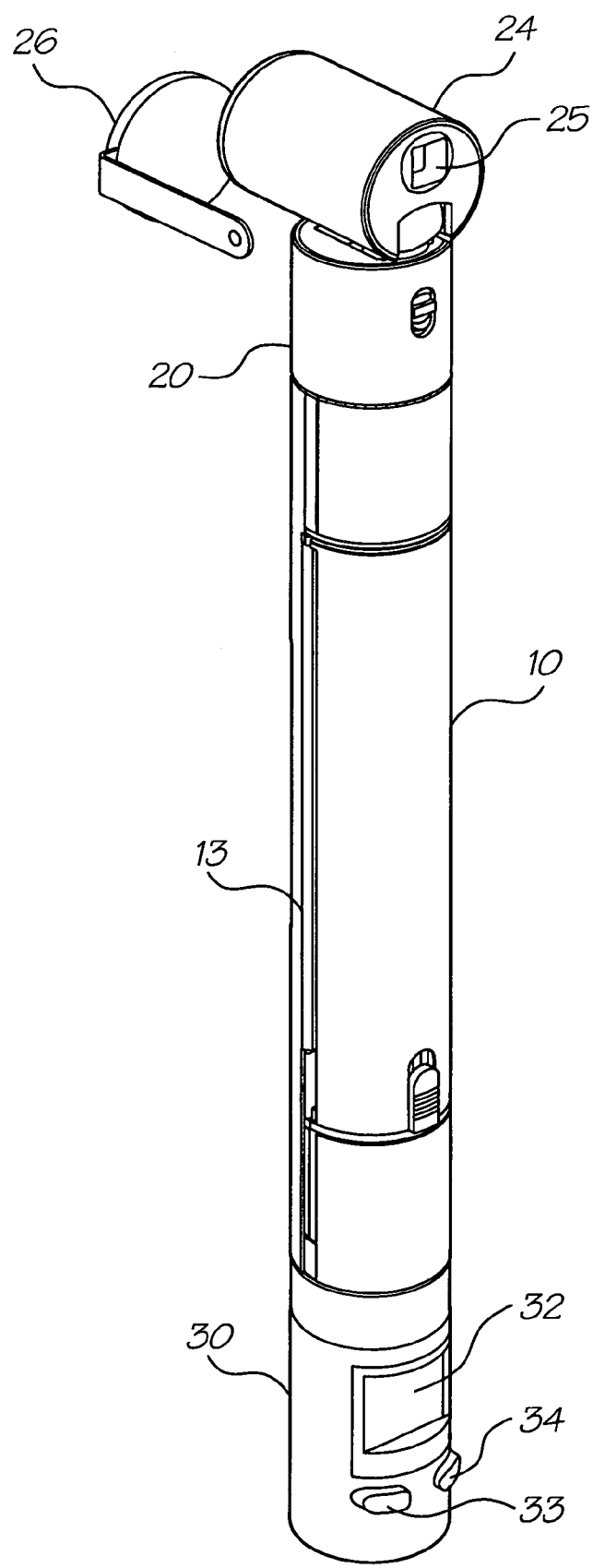
FIG. 15 is a third compact printer configuration.

FIG. 15 shows a further configuration in which a Memory Module 30 is connected to the configuration of FIG. 14. In the embodiment of FIG. 15, the user has the ability to transfer images between the Printer Module 10 and a storage area contained in the Memory Module 30. The user selects the image number on the Memory Module, and then either sends that image to the Printer Module (replacing whatever image was already stored there), or brings the current image from the Printer Module to the specified image number in the Memory Module. The Memory Module also provides a way of sending sets of thumbnail images to the Printer Module.

Multiple Memory Modules can be included in a given system, extending the number of images that can be stored. A given Memory Module can be disconnected from one compact printer system and connected to another for subsequent image printing.

With the Camera Module 20 attached to a Memory Module/Printer Module compact printer system, as shown in FIG. 15, the user can "Take" an image with the Camera Module, then transfer it to the specified image number in the Memory Module. The captured images can then be printed out in any order.

Figure 16:
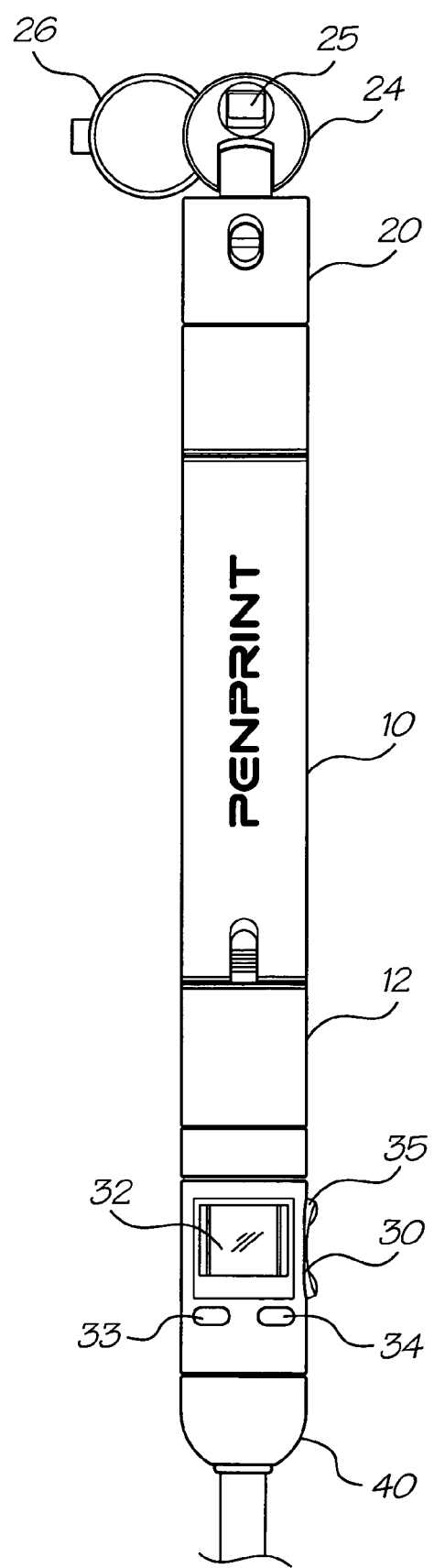
FIG. 16 is a fourth compact printer configuration.

By connecting a Communications Module 40 to the minimum configuration compact printer system, the user gains the ability to transfer images between a PC and the compact printer system. FIG. 16 shows the configuration of FIG. 15 with the addition of a Communications Module 40. The Communications Module makes the Printer Module 10 and any Memory Modules 30 visible to an external computer system. This allows the download or uploading of images. The communications module also allows computer control of any connected compact printer modules, such as the Camera Module 20.

In the general case, the Printer Module holds the "current" image, and the other modules function with respect to this central repository of the current image. The Printer Module is therefore the central location for image interchange in the compact printer system, and the Printer Module provides a service to other modules as specified by user interaction.

A given module may act as an image source. It therefore has the ability to transfer an image to the Printer Module. A different module may act as an image store. It therefore has the ability to read the image from the Printer Module. Some modules act as both image store and image source. These modules can both read images from and write images to the Printer Module's current image.

The standard image type has a single conceptual definition. The image definition is derived from the physical attributes of the printhead used in the Printer Module. The printhead is 2 inches wide and prints at 1600 dpi in cyan, magenta and yellow bi-level dots. Consequently a printed image from the compact printer system is 3200 bi-level dots wide.

The compact printer system prints on business card sized pages (85 mm×55 mm). Since the printhead is 2 inches wide, the business cards are printed such that 1 line of dots is 2 inches. 2 inches is 50.8 mm, leaving a 2 mm edge on a standard business-card sized page. The length of the image is derived from the same card size with a 2 mm edge. Consequently the printed image length is 81 mm, which equals 5100 1600 dpi dots. The printed area of a page is therefore 81 mm×51 mm, or 5100×3200 dots.

To obtain an integral contone to bi-level ratio a contone resolution of 267 ppi (pixels per inch) is chosen. This yields a contone CMY page size of 850×534, and a contone to bi-level ratio of 1:6 in each dimension. This ratio of 1:6 provides no perceived loss of quality since the output image is bi-level.

The printhead prints dots in cyan, magenta, and yellow ink. The final output to the printed page must therefore be in the gamut of the printhead and take the attributes of the inks into account. It would at first seem reasonable to use the CMY color space to represent images. However, the printer's CMY color space does not have a linear response. This is definitely true of pigmented inks, and partially true for dye-based inks. The individual color profile of a particular device (input and output) can vary considerably. Image capture devices (such as digital cameras) typically work in RGB (red green blue) color space, and each sensor will have its own color response characteristics.

Consequently, to allow for accurate conversion, as well as to allow for future image sensors, inks, and printers, the CIE L*a*b* color model [CIE, 1986, CIE 15.2 Colorimetry: Technical Report ($2^{nd}$ Edition), Commission Internationale De l'Eclairage] is used for the compact printer system. L*a*b* is well defined, perceptually linear, and is a superset of other traditional color spaces (such as CMY, RGB, and HSV).

The Printer Module must therefore be capable of converting L*a*b* images to the particular peculiarities of its CMY color space. However, since the compact printer system allows for connectivity to PCs, it is quite reasonable to also allow highly accurate color matching between screen and printer to be performed on the PC. However the printer driver or PC program must output L*a*b*.

Each pixel of a compact printer image is therefore represented by 24 bits: 8 bits each of L*, a*, and b*. The total image size is therefore 1,361,700 bytes (850×534×3).

Each image processing module is able to access the image stored in the Printer Module. The access is either to read the image from the Printer Module, or to write a new image to the Printer Module.

The communications protocol for image access to the Printer Module provides a choice of internal image organization. Images can be accessed either as 850×534 or as 534×850. They can also be accessed in interleaved or planar format. When accessed as interleaved, each pixel in the image is read or written as 24 bits: 8 bits each of L*, a*, b*. When accessed as planar, each of the color planes can be read or written independently. The entire image of L* pixels, a* pixels or b* pixels can be read or written at a time.

The Memjet printhead in the Printer module 10 is only capable of printing dots in a bi-level fashion. The stored contone CMY image must therefore be converted to a dithered CMY image. More specifically, a dispersed dot ordered dither is produced using a stochastic dither cell, converting a contone CMY image into a dithered bi-level CMY image.

Figure 17:
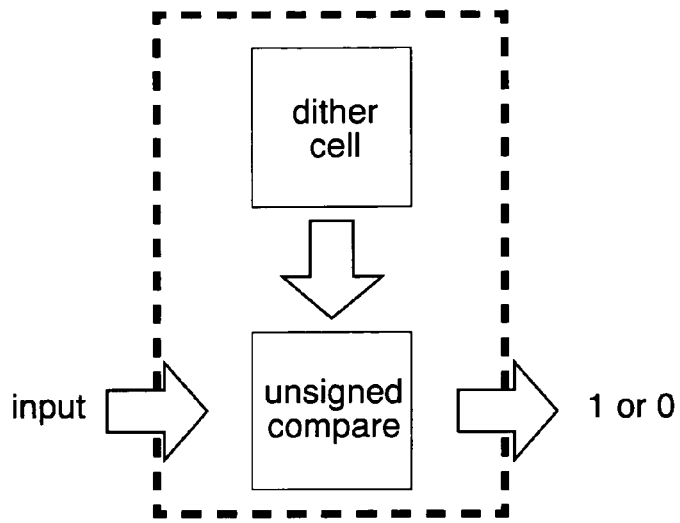
FIG. 17 illustrates half-toning using a 50×50 dither cell.

The 8-bit 1600 dpi contone value is compared to the current position in the dither cell. If the 8-bit contone value is greater than the dither cell value, an output bit of 1 is generated. Otherwise an output bit of 0 is generated. This output bit will eventually be sent to the printhead and control a single nozzle to produce a single C, M, or Y dot. The bit represents whether or not a particular nozzle will fire for a given color and position. This Half-toning process can be seen in FIG. 17.

The same position in the dither cell can be used for C, M, and Y. This is because the actual printhead produces the C, M, and Y dots for different lines of the image to be printed in the same print cycle. In the present invention, the staggering of the different colored dots effectively produces staggering in the dither cell.

The size of the dither cell depends on the resolution of the output dots. Since we are producing 1600 dpi dots, the cell size should be larger than 32×32. In addition, to allow the dot processing order to match the printhead segments, the size of the dither cell should ideally divide evenly into 800 (since there are 800 dots printed on one line by each segment of the printhead).

A dither cell size of 50×50 is large enough to produce high quality results, and each dimension of the dither cell divides evenly into 800 (16 times). Each entry of the dither cell is 8 bits, for a total of 2500 bytes (approximately 2.5 KB). However, alternative dither cell sizes that produce high quality results are envisaged.

Since the CMY image size is 534×850 pixels and the final print resolution is 3200×5100 dots, the CMY image must be up-interpolated by a ratio of 1:6 in both dimensions. This is achieved by the process of pixel replication whereby a single pixel value is used for a larger area, in this case a 6×6 block. Since the pixels are to be dithered, the 36 resultant bi-level dots take on the contone value of the replicated pixel.

The Up-Interpolate and Halftone processes produce the dots in the correct order for printing. The bits representing the dots are then collected in groups of 12 and sent to the printhead. This is the Reformat for Printer process.

Although the Up-Interpolate, Halftone, and Reformat For Printer tasks are defined as separate tasks, they are implemented as a single process in the hardware implementation of the central processor of the Printer Module 10.

Figure 18:
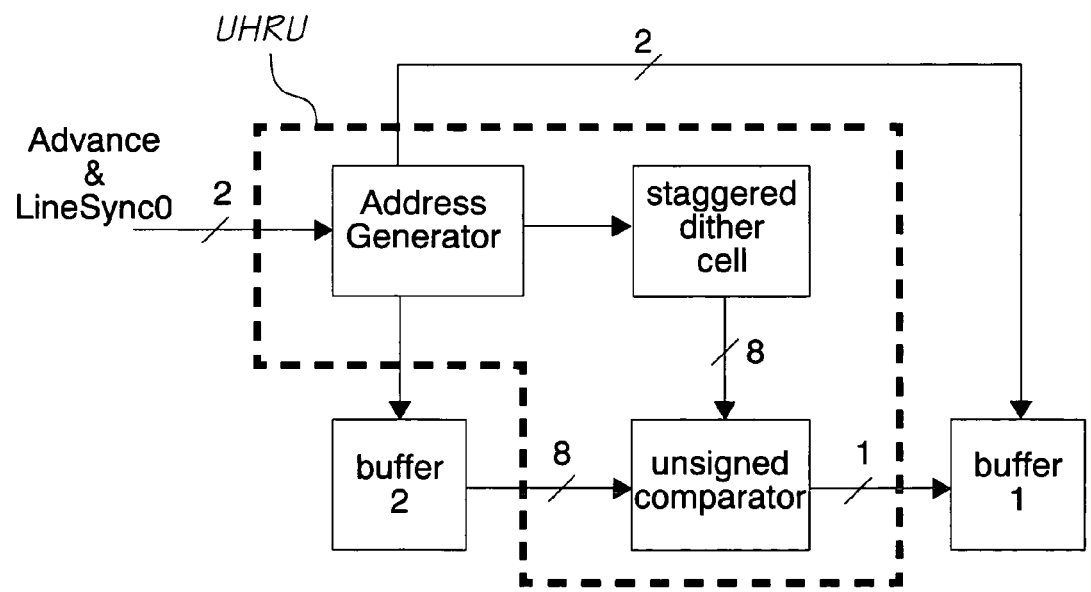
FIG. 18 shows an Up-interpolate, Halftone and Reformat-for-Printer process.

The Up-Interpolate, Halftone and Reformat for Printer process is shown in FIG. 18. The input to the Up-Interpolate, Halftone and Reformat Unit (UHRU) is the contone buffer (Buffer 2) containing the partial CMY image. The output is a set of 12-bit values in the correct order to be sent to the Memjet Interface (MJI) for subsequent output to the printhead via Buffer 1. The 12 output bits are generated 1 bit at a time, and sent to the 12-bit shift register in Buffer 1.

The control of this process is via an Advance signal from the MJI and a LineSync0 pulse from a LineSync Generator Unit (LSGU). When the UHRU starts up, and after each LineSync0 pulse, 12 bits are produced, and are clocked into the 12-bit shift register of Buffer 1. After the 12th bit has been clocked in, a TransferWriteEnable pulse is sent to Buffer 1 and the next 12 bits are generated. The UHRU then waits for the Advance pulse from the MJI. When the Advance pulse arrives, the TransferWriteEnable pulse is sent to Buffer 1, and the next 12 bits are calculated before waiting again. In practice, once the first Advance pulse is provided, synchronization has occurred and future Advance pulses will occur every 12 cycles thereafter.

As shown in FIG. 18, the Halftone task is undertaken by a simple 8-bit Unsigned Comparator. The two inputs to the comparator come from the Staggered Dither Cell and Buffer 2. The order that these values are presented to the Unsigned Comparator is determined by an Address Generator State Machine, which ensures that the addresses into the CMY image stored in Buffer 2 match the segment-oriented order required for the printhead. The Address Generator State Machine therefore undertakes the Up-Interpolation and Reformatting for Printer tasks. Rather than simply access an entire line at a time at high resolution, and then reformat the line according to the printer lookup requirements, the reformatting is achieved by the appropriate addressing of the CMY contone buffer (Buffer 2), and by ensuring that the comparator uses the correct lookup from the dither cell to match the staggered addresses.

The Half-toning task is as described above. The 50×50 Staggered Dither Cell ensures that a given position in the Staggered Dither Cell for one segment will be the same for the remaining 3 segments. The same position in the Dither Cell can be used for different colors due to the fact that dots on different lines of the final image are being generated at the same time for each of the colors.

The addressing for the Dither Cell is therefore quite simple. Starting at a particular row in the Staggered Dither Cell (e.g. row 0), the first Dither Cell entry used is Entry 0. This entry is used 12 times (12 cycles) to generate the 3 colors for all 4 segments. The entry is then advanced to Entry 1 of row 0. After Entry 49, we revert back to Entry 0 of row 0. This continues for all 9,600 cycles in order to generate all 9,600 dots. The Halftone Unit then stops and waits for the LineSync0 pulse that causes the address generator to advance to the next row in the Dither Cell.

Figure 19:
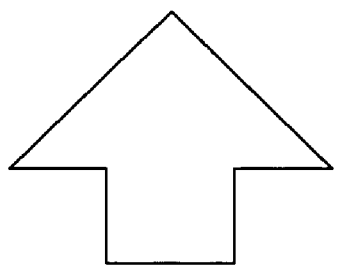
FIG. 19 is shows mapping a Standard Dither Cell to a Staggered Pixel Dither Cell.

The Staggered Dither Cell is so called because it differs from a regular dither cell by having the odd and even lines staggered. This is because the odd and even pixels (starting from pixel 0) are generated on different lines. This saves the Address Generator from having to advance to the next row and back again on alternate sets of 12 pixels, thus reducing the circuitry required. FIG. 19 shows a simple dither cell, and how to map it to a staggered dither cell of the same size. Note that, for determining the "oddness" of a given position, we number the pixels in a given row 0, 1, 2 etc.

The 8-bit value from Buffer 2 is compared (unsigned) to the 8-bit value from the Staggered Dither Cell. If the Buffer 2 pixel value is greater than or equal to the Dither Cell value, a "1" bit is output to the shift register of Buffer 1. Otherwise a "0" bit is output to the shift register of Buffer 1.

In order to halftone 9,600 contone pixels, 9,600 contone pixels must be read in. The Address Generator Unit performs this task, generating the addresses into Buffer 2, effectively implementing the UpInterpolate task. The address generation for reading Buffer 2 is slightly more complicated than the address generation for the Dither Cell, but not overly so.

The Address Generator for reading Buffer 2 only begins once the first row of Buffer 2 has been written. The remaining rows of Buffer 2 are 0, the reading of which would result in no printed dots.

Each of the 6 effective output lines has a register with an integer and fractional component. The integer portion of the register is used to select which Buffer line will be read to effectively up-interpolate the color for that particular color's odd and even pixels. 3 pixel counters are used to maintain the current position within segment 0, and a single temporary counter P_ADR (pixel address) is used to offset into the remaining 3 segments.

In summary, address generation for reading Buffer 2 requires the following registers, as shown in Table 1.

TABLE 1

Registers Required for Reading Buffer 2

| Register Name | Size |
| --- | --- |
| CyanEven | 6 bits (3:3) |
| CyanOdd | 6 bits (3:3) |
| MagentaEven | 6 bits (3:3) |
| MagentaOdd | 6 bits (3:3) |
| YellowEven | 6 bits (3:3) |
| YellowOdd | 6 bits (3:3) |
| Cyan_P_ADR | 13 bits (10:3) |
| Magenta_P_ADR | 13 bits (10:3) |
| Yellow_P_ADR | 13 bits (10:3) |
| P_ADR | 13 bits (100:3) |

The initial values for the 6 buffer line registers is the physical dot distance between nozzles (remember that the fractional component is effectively a divide by 6). For example, if the odd and even output dots of a color are separated by a distance of 1 dot, and nozzles of one color are separated from the nozzles of the next by 8 dots, the initial values would be as shown in the First Line column in Table 2. Once each set of 9,600 dots has been generated, each of these counters must increment by 1 fractional component, representing the fact that we are sampling each pixel 6 times in the vertical dimension. The resultant values will then be as shown in the Second Line column in Table 2. Note that 5:5+1=0:0 since there are only 6 buffer lines.

TABLE 2

Example Initial Setup and Second Line Values for the 6 Buffer Line Registers

| | | First Line | | Second Line | |
| --- | --- | --- | --- | --- | --- |
| Name | Calculation | Value | Buff | Value | Buff |
| CyanEven | Initial Position | 0:0 | 0 | 0:1 | 0 |
| CyanOdd | CyanEven + 0:1 | 0:1 | 0 | 0:2 | 0 |
| MagentaEven | CyanOdd + 1:2 (8) | 1:3 | 1 | 1:4 | 1 |

TABLE 2-continued

Example Initial Setup and Second Line
Values for the 6 Buffer Line Registers

| | | First Line | | Second Line | |
|---|---|---|---|---|---|
| Name | Calculation | Value | Buff | Value | Buff |
| MagentaOdd | MagentaEven + 0:1 | 1:4 | 1 | 1:5 | 1 |
| YellowEven | MagentaOdd + 1:2 (8) | 3:0 | 2 | 3:1 | 3 |
| YellowOdd | YellowEven + 0:1 | 3:1 | 3 | 3:2 | 3 |

The 6 buffer line registers determine which of the buffer lines is to be read for a given color's odd or even pixels. To determine which of the contone pixels are read from the specific line of Buffer 2, we use 3 Pixel Address counters, one for each color, and a single temporary counter (P_ADR) which is used to index into each of the 4 segments. Each segment is separated from the next by 800 dots. In contone pixels this distance is 133:2 (800/6). We generate the 4 addresses for the even cyan pixels, then the 4 addresses for the even magenta, and finally the 4 addresses for the even yellow. We then do the same for the odd cyan, magenta, and yellow pixels. This process of two sets of 12 bits—12 even then 12 odd, is performed 400 times. We can then reset the Pixel Address counters (X_P_ADR) to 0 and advance the 6 buffer line registers. Every 6 line advances, the next buffer line is now free and ready for updating (by the Convert to CMY process). Table 3 lists the steps in a simple form.

TABLE 3

Address Generation for Reading Buffer 2

| # | Address | Calculation | Comment |
|---|---|---|---|
| 0 | | P_ADR = Cyan_P_ADR Cyan_P_ADR += 0:1 | Generate address for even pixel in Cyan segment 0 and advance to next pixel for cyan |
| 1 | CyanEven: P_ADR | P_ADR += 133:2 | Advance to segment 1 (cyan) |
| 2 | CyanEven: P_ADR | P_ADR += 133:2 | Advance to segment 2 (cyan) |
| 3 | CyanEven: P_ADR | P_ADR += 133:2 | Advance to segment 3 (cyan) |
| 4 | CyanEven: P_ADR | P_ADR = Magenta_P_ADR Magenta_P_ADR += 0:1 | Generate address for even pixel in Magenta segment 0 and advance to next pixel for magenta |
| 5 | MagentaEven: P_ADR | P_ADR += 133:2 | Advance to segment 1 (magenta) |
| 6 | MagentaEven: P_ADR | P_ADR += 133: | Advance to segment 2 (magenta) |
| 7 | MagentaEven: P_ADR | P_ADR += 133:2 | Advance to segment 3 (magenta) |
| 8 | MagentaEven: P_ADR | P_ADR = Yellow_P_ADR Yellow_P_ADR += 0:1 | Generate address for even pixel in Yellow segment 0 and advance to next pixel for yellow |
| 9 | YellowEven: P_ADR | P_ADR += 133:2 | Advance to segment 1 (yellow) |
| 10 | YellowEven: P_ADR | P_ADR += 133:2 | Advance to segment 2 (yellow) |
| 11 | YellowEven: P_ADR | P_ADR += 133:2 | Advance to segment 3 (yellow) |
| 12 | YellowEven: P_ADR | P_ADR =Cyan P_ADR Cyan_P_ADR += 0:1 | Generate address for odd pixel in Cyan segment 0 and advance to next pixel for cyan |
| 13 | CyanOdd: P_ADR | P_ADR += 133:2 | Advance to segment 1 (cyan) |
| etc | | | |

Throughout the specification the aim has been to describe the preferred embodiments of the invention without limiting the invention to any one embodiment or specific collection of features. Persons skilled in the relevant art may realize variations from the specific embodiments that will nonetheless fall within the scope of the invention.

The invention claimed is:

1. A method of generating a staggered dither cell for an image to be printed, said method comprising the steps of:
    writing color component values corresponding to even pixels in first entry locations in a dither cell;
    writing color component values corresponding to odd pixels in second entry locations in said dither cell; and
    mapping said dither cell to a staggered dither cell such that lines of said even pixel values are staggered relative to lines of said odd pixel values.

2. The method of claim 1 wherein said writing step further includes writing said color component values in said first and second entry locations in a correct order for printing by a printhead.

3. The method of claim 1 wherein said writing step further includes writing a number of color component values in one entry location, said number being determined by loading criteria of a printhead.

4. The method of claim 1 wherein said writing steps further comprise writing twelve color component values in each of said first and second entry locations.

5. A staggered dither cell for storing color component values of an image to be printed, said dither cell comprising:
    an n×n entry cell where n divides evenly into the number of dots printable by each segment of a printhead;
    more than one color component value stored in each entry location of said cell; and
    lines of said values corresponding to odd pixels of said image in said cell staggered relative to lines of said values corresponding to even pixels of said image.

6. The staggered dither cell of claim 5 wherein n=50.

7. The staggered dither cell of claim 5 wherein twelve of said color component values are stored in each entry location.

8. The dither cell of claim 7 wherein said twelve color components consist of three colors to be printed for four segments of a printhead.

9. A method of converting an image into a dithered, bi-level image for printing, comprising the steps of:
    storing an up-interpolated version of said image in a first buffer;
    storing color component values corresponding to odd and even pixels in a dither cell;
    staggering lines of said color component values corresponding to odd pixels relative to lines of even pixel values to form a staggered dither cell;
    comparing each pixel value in said first buffer with its corresponding value in said staggered dither cell; and
    outputting an instruction to print to a second buffer if said value from said first buffer is greater than or equal to said staggered dither cell value.

10. The method of claim 9 wherein said storing of said up-interpolated image and
    said storing of said color component values are controlled by means of an address generator.

* * * * *